Aug. 12, 1958 J. A. COTA 2,847,079
POWER STEERING MECHANISM WITH HYDRAULIC
CYLINDER STABILIZING MEANS
Filed Feb. 27, 1956 2 Sheets-Sheet 1

J. A. COTA
INVENTOR.

BY

ATTORNEYS

Aug. 12, 1958      J. A. COTA      2,847,079
POWER STEERING MECHANISM WITH HYDRAULIC
CYLINDER STABILIZING MEANS
Filed Feb. 27, 1956      2 Sheets-Sheet 2

J. A. COTA
INVENTOR.

BY *E. C. McRae*
*J. R. Faulkner*
*J. H. Oster*

ATTORNEYS

United States Patent Office 2,847,079
Patented Aug. 12, 1958

2,847,079

POWER STEERING MECHANISM WITH HYDRAULIC CYLINDER STABILIZING MEANS

John A. Cota, Dearborn, Mich., assignor to Ford Motor Company, Dearborn, Mich., a corporation of Delaware Application February 27, 1956, Serial No. 567,829

2 Claims. (Cl. 180—79.2)

This invention relates to power steering mechanisms for motor vehicles.

In one type of power steering mechanism for motor vehicles, a power steering cylinder is arranged transversely of the vehicle frame and is directly connected to tie rods extending in opposite directions to steering arms carried by the front road wheels. A piston rod extending from one end of the cylinder is anchored to a vehicle frame member so that the application of fluid pressure to opposite ends of the cylinder under suitable conventional control means is effective to cause transverse movement of the power steering cylinder and a corresponding turning movement of the road wheels. With this type of construction certain forces are present tending to rotate the power steering cylinder about its axis. These forces include not only the unbalance resulting from the fact that the tie rods are connected to the cylinder at one side, but also dynamic steering forces transmitted through the tie rods to the cylinder. It is accordingly an object of the present invention to provide simple yet effective means for restraining rotation of the cylinder about its axis, while at the same time permitting the movement of the cylinder transversely of the vehicle necessary to steer the road wheels. This is accomplished in the present instance by providing a pair of articulated links pivotally connected between the power steering cylinder and a vehicle frame member. The articulated links function as an anti-rotation device restraining rotation of the cylinder about its axis.

Other objects and advantages of this invention will be made more apparent as this description proceeds, particularly when considered in connection with the accompanying drawings, wherein.

Figure 2:
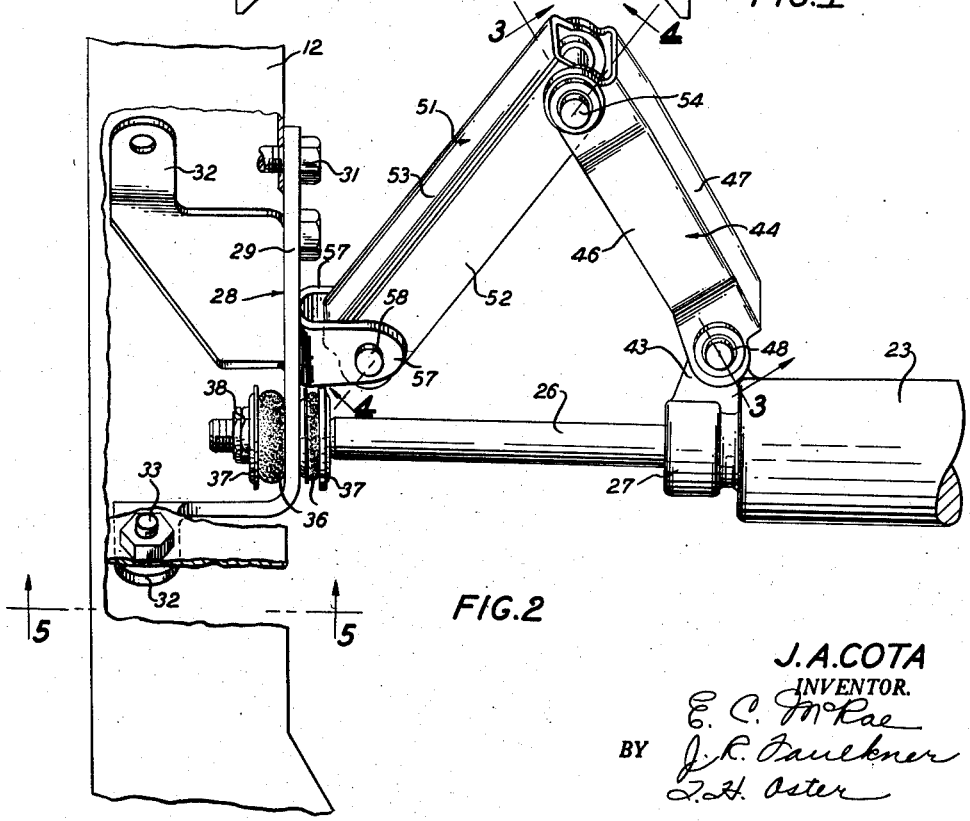
Figure 2 is an enlarged plan view, partly broken away and in section, of a portion of the structure shown in Figure 1.
Figure 3:
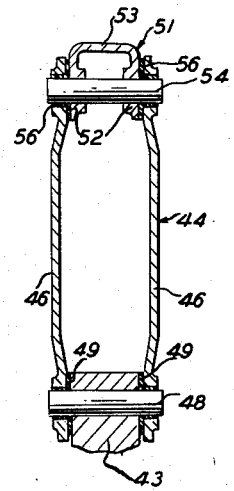
Figure 4:
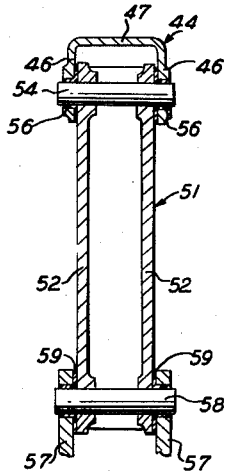
Figure 5:
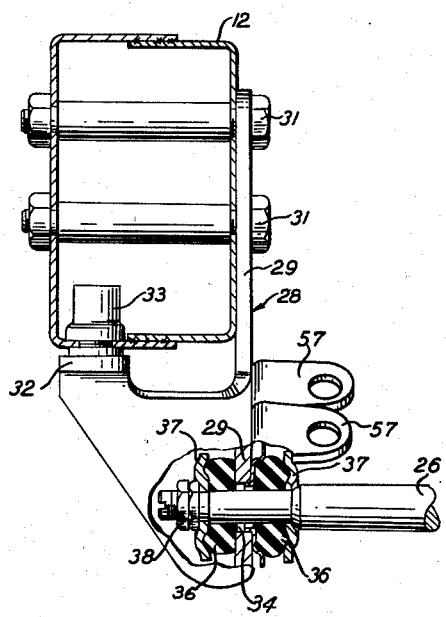

Figures 3, 4 and 5 are cross sectional views taken on the planes indicated by the lines 3—3, 4—4 and 5—5 of Figure 2.

Figure 1:
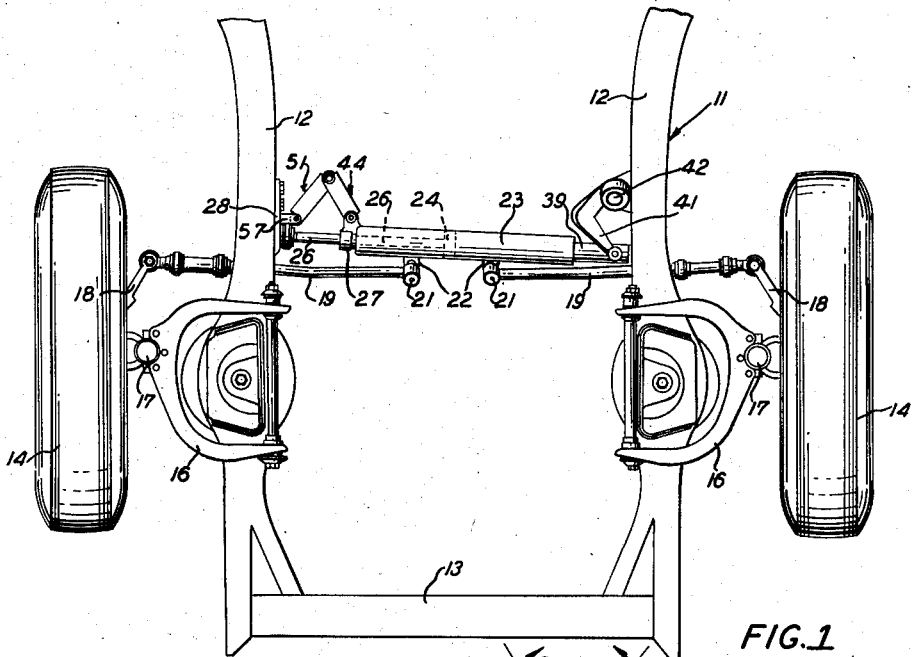
Figure 1 is a plan view of the forward portion of a vehicle chassis incorporating the present invention.

Referring now to the drawings, and particularly to Figure 1, there is shown a motor vehicle chassis 11 having side frame rails 12 interconnected at their forward ends by a cross frame member 13. Steerable front road wheels 14 are mounted upon suspension arms 16 to permit rising and falling movement of the wheels during jounce and rebound, and are connected to the suspension arms by ball joints 17 permitting the wheels to be turned about substantial vertical axes for steering purposes. Steering arms 18 are connected to the road wheels and at their rearward ends are pivotally connected to transversely extending tie rods 19 which pass beneath the side frame rails 12. At their inner ends the tie rods 19 are connected by means of ball joints 21 to flanges 22 carried by and projecting forwardly from a transversely disposed power steering cylinder 23.

A piston 24 is reciprocably mounted within the power steering cylinder 23 at one end of a piston rod 26. As best seen in Figures 2 and 5, the piston rod 26 projects through the end portion 27 of the cylinder and is flexibly connected at its outer end to a mounting bracket 28 secured to the side frame rail 12 of the vehicle.

The mounting bracket 28 is formed with a vertical flange 29 positioned adjacent the inner side of the side frame rail 12 and secured thereto by bolts 31. Integrally formed with the vertical flange 29 are generally horizontal mounting flanges 32 secured to the lower portion of the side frame rail 12 by bolts 33. The vertical flange 29 of the mounting bracket projects downwardly beneath the side frame rail 12 and is formed with an aperture 34 through which the outer end of the piston rod 26 projects. A pair of rubber pucks 36 are sleeved on the piston rod 26 on opposite sides of the vertical flange 29 of the mounting bracket, being held in position by washers 37 and nuts 38. It will be noted that the aperture 34 provides clearance for the piston rod 26 and that the rubber pucks 36 cooperate therewith to permit a limited amount of angular movement of the piston rod during operation.

A valve housing 39 is mounted at the opposite end of the power steering cylinder 23 and contains valve mechanism actuated in conventional manner by means of a pitman arm 41 connected thereto and mounted upon the steering shaft 42 of the manually operated steering gear mechanism (not shown).

Referring now to Figure 2, as well as to Figures 3, 4, and 5, it will be noted that the end portion 27 of the power steering cylinder 23 is formed with an integral flange 43 extending generally rearwardly therefrom. A generally channel shaped link 44, having side flanges 46 and a base 47, is located rearwardly of the power steering cylinder and is arranged with the forward ends of its side flanges 46 embracing the integral flange 43 of the cylinder. A pivot pin 48, together with bushings 49, pivotally connect the forward end of the link 44 to the flange 43 of the cylinder.

A second and somewhat similar channel shaped link 51 is provided, having side flanges 52 and a base 53. The rearward portions of the side flanges 52 of the channel shaped link 51 fit within and are embraced by the rearward portions of the side flanges 46 of the link 44, being pivotally connected thereto by means of a pivot pin 54 and bushings 56.

At its forward end the side flanges 52 of the channel shaped link 51 extend between ears 57 formed integrally with the vertical side flange 29 of the mounting bracket 28. The link 51 is pivotally connected to the ears 57 by means of a pivot pin 58 and bushings 59.

During operation of the vehicle fluid under pressure is supplied to the power steering cylinder 43 on opposite sides of the piston 24 in accordance with the actuation of the steering valve mechanism 39. Since the piston rod 26 is anchored to the frame side rail the power application results in bodily movement of the cylinder 23 in a direction transversely of the vehicle to effect a corresponding movement of the tie rods 19 and the road wheels 14. There is a tendency for power cylinder 23 to rotate about its own axis due to unbalanced forces applied thereto through the tie rods 19. This tendency of the cylinder 23 to rotate about its own axis, which would result in misalignments and impair the proper operation of the power steering mechanism, is effectively resisted by means of the articulated links 47 and 51. Sufficient rigidity is obtained, through the channel shaped links and their pivotal connections to each other and to the frame mounting bracket and the power steering cylinder flange, to effectively restrain rotation of the cylinder. At the same time, the links may freely collapse and extend to accommodate the transverse movement of the cylinder.

It will be understood that the invention is not to be limited to the exact construction shown and described, but that various changes and modifications may be made without departing from the spirit and scope of the invention, as defined in the appended claims.

What is claimed is:

1. Power steering mechanism for a motor vehicle having a pair of longitudinal box section frame rails and a pair of steerable road wheels, a power steering cylinder disposed transversely between said frame rails, a steering gear shaft pivotally mounted upon one of said frame rails, a pitman arm on said shaft pivotally connected to one end of said power steering cylinder, a pair of steering links pivotally connected at their inner ends to said cylinder and at their outer ends to said road wheels so that transverse movement of said cylinder will result in steering movements of said wheels, a piston reciprocable within said cylinder, a piston rod connected to said piston and extending from one end of said cylinder, a supporting bracket having a vertical flange secured to the inner side wall of the other of said box section frame rails and an integral horizontal flange secured to the lower wall of said one frame rail, said vertical flange of said supporting bracket extending beneath said frame rail and connected to the extending portion of said piston rod, said vertical flange having a transversely extending flange projecting toward said cylinder, a link pivotally connected to said transversely extending flange, a second link pivotally connected to the adjacent end of said cylinder, said links extending diagonally with respect to said piston rod and cylinder and lying in a common plane extending in the same general direction as said pitman arm, said links being pivotally connected together at their free ends to restrain rotation of said cylinder about its transverse axis while permitting transverse translation of said cylinder to effect steering of said road wheels.

2. Power steering mechanism for a motor vehicle having a pair of longitudinal frame members and a pair of steerable road wheels, a power steering cylinder disposed transversely between said frame members, a steering gear shaft pivotally mounted upon one of said frame members, a pitman arm on said shaft pivotally connected to one end of said power steering cylinder, a pair of steering links pivotally connected at their inner ends to said cylinder and at their outer ends to said road wheels so that transverse movement of said cylinder will result in steering movements of said wheels, a piston reciprocable within said cylinder, a piston rod connected to said piston and extending from one end of said cylinder, a supporting bracket mounted upon said other frame member, means connecting the extending portion of said piston rod to said supporting bracket, a link pivotally connected to said supporting bracket adjacent the connection of said piston rod to said supporting bracket, a second link pivotally connected to the adjacent end of said cylinder, said links extending diagonally with respect to said piston rod and cylinder and lying in a common plane, which plane extends from said cylinder in substantially the same direction as said pitman arm, said links being pivotally connected together at their free ends to restrain rotation of said cylinder about its transverse axis while permitting transverse translation of said cylinder to effect steering of said road wheels.

References Cited in the file of this patent

UNITED STATES PATENTS

| | | |
|---|---|---|
| 2,418,325 | Wassall et al. | Apr. 1, 1947 |
| 2,676,663 | Smith | Apr. 27, 1954 |